United States Patent
Davis

(10) Patent No.: US 12,208,923 B2
(45) Date of Patent: Jan. 28, 2025

(54) METHOD FOR FABRICATING AN AIRCRAFT CONTROL SURFACE

(71) Applicant: Rohr, Inc., Chula Vista, CA (US)

(72) Inventor: Jennifer Davis, La Jolla, CA (US)

(73) Assignee: ROHR INC., Chula Vista, CA (US)

( * ) Notice: Subject to any disclaimer, the term of this patent is extended or adjusted under 35 U.S.C. 154(b) by 0 days.

(21) Appl. No.: 18/172,955

(22) Filed: Feb. 22, 2023

(65) Prior Publication Data

US 2023/0192320 A1 Jun. 22, 2023

Related U.S. Application Data

(62) Division of application No. 16/594,522, filed on Oct. 7, 2019, now Pat. No. 11,613,383.

(51) Int. Cl.
| | |
|---|---|
| *B64F 5/10* | (2017.01) |
| *B29C 45/00* | (2006.01) |
| *B29C 45/14* | (2006.01) |
| *B29C 45/26* | (2006.01) |
| *B64C 9/00* | (2006.01) |
| *B29C 31/00* | (2006.01) |
| *B29C 33/76* | (2006.01) |
| *B29C 70/54* | (2006.01) |

(Continued)

(52) U.S. Cl.
CPC ............ *B64F 5/10* (2017.01); *B29C 45/0046* (2013.01); *B29C 45/14786* (2013.01); *B29C 45/2624* (2013.01); *B64C 9/00* (2013.01); *B29C 31/00* (2013.01); *B29C 33/76* (2013.01); *B29C 45/14* (2013.01); *B29C 45/14475* (2013.01); *B29C 2045/14532* (2013.01); *B29C 70/548* (2013.01); *B29L 2031/00* (2013.01); *B29L 2031/3076* (2013.01); *B64C 3/20* (2013.01)

(58) Field of Classification Search
None
See application file for complete search history.

(56) References Cited

U.S. PATENT DOCUMENTS

| 5,152,949 A | 10/1992 | Leoni et al. |
| 6,475,320 B1 | 11/2002 | Masugi |
| | (Continued) | |

FOREIGN PATENT DOCUMENTS

| CN | 105150558 | 12/2015 |
| CN | 106584719 | 4/2017 |
| | (Continued) | |

OTHER PUBLICATIONS

European Patent Office, European Office Action dated Oct. 24, 2023 in Application No. 19214559.7.

(Continued)

*Primary Examiner* — Benjamin A Schiffman
(74) *Attorney, Agent, or Firm* — SNELL & WILMER L.L.P.

(57) ABSTRACT

A tool for fabricating a control surface is disclosed. In various embodiments, the tool includes a first block defining a longitudinal direction running between a leading edge end and a trailing edge end; a first sidewall spaced a first lateral distance from the first block to form a first closeout channel running in the longitudinal direction between the first block and the first sidewall; and a second sidewall configured to (Continued)

form a second closeout channel running in the longitudinal direction, the second closeout channel disposed laterally opposite the tool from the first closeout channel.

5 Claims, 10 Drawing Sheets

(51) Int. Cl.
*B29L 31/00* (2006.01)
*B29L 31/30* (2006.01)
*B64C 3/20* (2006.01)

(56) References Cited

U.S. PATENT DOCUMENTS

| | | | |
|---|---|---|---|
| 6,519,835 | B1 | 2/2003 | Von Arx et al. |
| 9,962,904 | B2 | 5/2018 | Hatanaka et al. |
| 10,086,563 | B2 | 10/2018 | Hattori et al. |
| 11,046,034 | B2 | 6/2021 | Fiegl |
| 2007/0057123 | A1 | 3/2007 | Gahete et al. |
| 2014/0145032 | A1 | 5/2014 | Moselage, III |
| 2017/0232642 | A1 | 8/2017 | Fiegl et al. |

FOREIGN PATENT DOCUMENTS

| | | |
|---|---|---|
| EP | 1074466 | 2/2001 |
| EP | 1764307 | 3/2007 |
| WO | 2017062809 | 4/2017 |

OTHER PUBLICATIONS

European Patent Office, European Search Report dated Jul. 21, 2020 in Application No. 19214559.7.
European Patent Office, European Office Action dated Aug. 5, 2022 in Application No. 19214559.7.
USPTO; Requirement for Restriction dated Aug. 23, 2021 in U.S. Appl. No. 16/594,522.
USPTO; First Action Pre-Interview Office Action dated Feb. 9, 2022 in U.S. Appl. No. 16/594,522.
USPTO; First Action Interview Office Action dated Mar. 9, 2022 in U.S. Appl. No. 16/594,522.
USPTO; Final Office Action dated Jul. 25, 2022 in U.S. Appl. No. 16/594,522.
USPTO; Advisory Action dated Oct. 12, 2022 in U.S. Appl. No. 16/594,522.
USPTO; Notice of Allowance dated Dec. 6, 2022 in U.S. Appl. No. 16/594,522.

METHOD FOR FABRICATING AN AIRCRAFT CONTROL SURFACE

CROSS-REFERENCE TO RELATED APPLICATIONS

This application is a divisional of U.S. patent application Ser. No. 16/594,522, entitled "Tool for Fabricating an Aircraft Control Surface", filed on Oct. 7, 2019 which is hereby incorporated by reference in its entirety.

FIELD

The present disclosure relates generally to control surfaces and, more particularly, to methods and apparatus used to fabricate control surfaces for aircraft.

BACKGROUND

An aircraft may include several control surfaces configured to affect the yaw, roll and pitch of the aircraft during flight. Such control surfaces may include, for example, ailerons to affect the roll about a longitudinal axis, a rudder to affect the yaw about a vertical axis and an elevator to affect the pitch about a lateral axis, each axis being with respect to a coordinate system fixed to the aircraft. Additional control surfaces include trailing edge flaps configured to affect the lift of a wing, leading edge slats configured to affect the stall speed of a wing and spoilers, generally located adjacent to and forward of the trailing edge flaps and configured to disrupt the airflow over a wing surface to reduce lift or to increase drag. Control surfaces are typically airfoil-like components configured to alter the flow of air about the wings or tail structure of the aircraft. As such, an individual control surface is generally simple in shape, having one or more of a leading edge, a trailing edge, a pressure side and a suction side. Notwithstanding the simple shape, a control surface or the airfoil-like component thereof, must possess sufficient structural integrity to withstand the forces applied to it during use over the operational life of the aircraft. Control surfaces exhibiting low weight and high strength may be fabricated using hollow airfoil-like bodies having stringers and solid material sections positioned where the aerodynamic forces tend to present maximal loads.

SUMMARY

A tool for fabricating a control surface is disclosed. In various embodiments, the tool includes a first block defining a longitudinal direction running between a leading edge end and a trailing edge end; a first sidewall spaced a first lateral distance from the first block to form a first closeout channel running in the longitudinal direction between the first block and the first sidewall; and a second sidewall configured to form a second closeout channel running in the longitudinal direction, the second closeout channel disposed laterally opposite the tool from the first closeout channel. In various embodiments, the second sidewall is spaced a second lateral distance from the first block to form the second closeout channel running in the longitudinal direction between the first block and the second sidewall.

In various embodiments, a second block is positioned laterally adjacent the first block and spaced a second lateral distance from the first block to form an internal channel. In various embodiments, the first block and the second block include a terminal end configured to provide a forward boundary for a hollow trailing edge region. In various embodiments, at least one of the first sidewall and the second sidewall includes an orifice configured to transfer a resin into the hollow trailing edge region. In various embodiments, the internal channel is in fluid communication with the hollow trailing edge region. In various embodiments, at least one of the first sidewall and the second sidewall is in fluid communication with the hollow trailing edge region.

In various embodiments, a second block is positioned laterally adjacent the first block and spaced a second lateral distance from the first block to form an internal channel, the second sidewall being spaced a third lateral distance from the second block to form the second closeout channel. In various embodiments, the first block and the second block define an upper surface configured to engage a shell, the shell configured to provide an upper boundary to the internal channel. In various embodiments, the shell is configured to provide the upper boundary to at least one of the first closeout channel and the second closeout channel.

In various embodiments, the first block and the second block define a lower surface configured to engage the shell, the shell configured to provide a lower boundary to the internal channel and to at least one of the first closeout channel and the second closeout channel. In various embodiments, the first block and the second block include a terminal end configured to provide a forward boundary for a hollow trailing edge region and the shell is configured to provide an outer boundary for the hollow trailing edge region.

A method for fabricating a control surface is disclosed. In various embodiments, the method includes positioning a shell about a tool defining an internal channel and a hollow trailing edge region, the shell comprising an upper shell portion and a lower shell portion of the control surface; injecting a resin into the hollow trailing edge region to fill the internal channel and the hollow trailing edge region; and cooling the resin to form a stringer connected to the upper shell portion and the lower shell portion and a solid trailing edge region connected to the stringer and to the upper shell portion and the lower shell portion.

In various embodiments, the tool defines at least one of a first closeout channel and a second closeout channel. In various embodiments, at least one of the first closeout channel and the second closeout channel are filled with the resin and cooled to form at least one of a first closeout and a second closeout connected to the upper shell portion and the lower shell portion.

In various embodiments, the tool for the method includes a first block defining a longitudinal direction running between a leading edge end and a trailing edge end; and a second block positioned laterally adjacent the first block and spaced a lateral distance from the first block to form the internal channel. In various embodiments, the tool further includes a first sidewall spaced in a lateral direction from the first block to form a first closeout channel running in the longitudinal direction between the first block and the first sidewall; and a second sidewall spaced in the lateral direction from the second block to form a second closeout channel running in the longitudinal direction between the first block and the second sidewall.

A monolithic control surface is disclosed. In various embodiments, the control surface includes an upper shell portion; a lower shell portion; a stringer connected to the upper shell portion and the lower shell portion; and a solid trailing edge region connected to the upper shell portion, the lower shell portion and the stringer. In various embodiments, a first closeout is connected to the upper shell portion, the lower shell portion and the solid trailing edge region. In various embodiments, a second closeout is connected to the upper shell portion, the lower shell portion and the solid trailing edge region.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
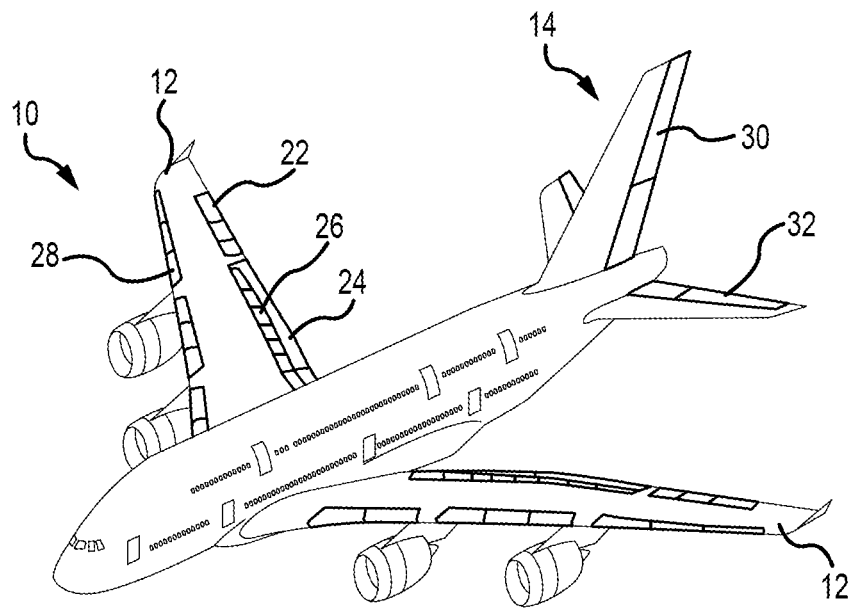
FIG. 1A is a perspective view of an aircraft having a variety of control surfaces distributed about the wings and tail structure, in accordance with various embodiments.
Figure 1B:
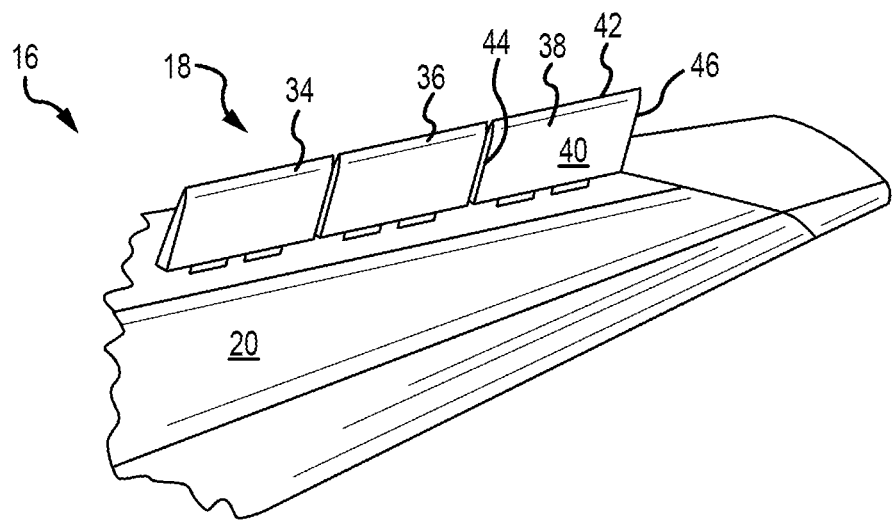
FIG. 1B is a perspective view of an aircraft wing having spoilers illustrated in a deployed position, in accordance with various embodiments.

Referring now to the drawings, FIG. 1A illustrates an aircraft 10 having a variety of control surfaces disposed about the wings 12 and the tail section 14 of the aircraft, while FIG. 1B illustrates a wing 16 having a plurality of spoilers 18 disposed along an upper surface 20 of the wing 16, with each of the plurality of spoilers 18 illustrated in a deployed position. Referring specifically to FIG. 1A, the variety of control surfaces typically used on the wings 12 of the aircraft 10 may include, for example, an aileron 22, a trailing edge flap 24, a spoiler 26, disposed adjacent to and forward of the trailing edge flap 24, and a leading edge slat 28. Similarly, the variety of control surfaces typically used on the tail section 14 of the aircraft 10 may include, for example, a rudder 30 and an elevator 32. While the foregoing description of the variety of control surfaces generally refers to each control surface as a single component, it will be appreciated that, in various embodiments, each individual component, e.g., the spoiler 26, may be a single component within a plurality of like components, e.g., the plurality of spoilers 18, as illustrated in FIG. 1B. For example, with reference to FIG. 1B, the plurality of spoilers 18 may, in various embodiments, include a first spoiler 34, a second spoiler 36 and a third spoiler 38. In various embodiments, each one of the plurality of spoilers 18 includes an upper surface 40 and a lower surface opposite the upper surface 40, a trailing edge 42, and an inboard end 44 (or a first end) and an outboard end 46 (or a second end). While the disclosure that follows is presented in the context of fabricating a spoiler, such as, for example, one of the plurality of spoilers 18 just described, it will be appreciated that the same method of fabrication is applicable to fabricating a variety of other control surfaces, including, for example, those identified and described above.

Referring now to FIGS. 2A, 2B, 2C, 2D and 2E, various aspects of a tool 200 used to fabricate a control surface, such as, for example, one of the plurality of spoilers 18 described above with reference to FIG. 1B, are described, in accordance with various embodiments. The tool 200 includes a leading edge end 202 and a trailing edge end 204, a first sidewall 206 and a second sidewall 208, and an upper surface 210 and a lower surface 212. A plurality of blocks 214 (or wedges), including a first block 216, a second block 218 and a third block 220, is positioned within an interior of the tool 200. The plurality of blocks 214 is arranged such that a plurality of internal channels 222 is formed, running in a longitudinal direction between the leading edge end 202 and the trailing edge end 204. For example, the first block 216 and the second block 218 are spaced a lateral distance (or a first lateral distance) in the lateral direction (running between the first sidewall 206 and the second sidewall 208) to form a first internal channel 224. As discussed below, the plurality of internal channels 222 is configured to provide a plurality of stringers that run longitudinally within an interior of the control surface, e.g., the spoiler, undergoing fabrication.

In addition to the plurality of internal channels 222, the first block 216 is spaced a lateral distance (or a second lateral distance) from the first sidewall 206 to form a first closeout channel 226 and the third block 220 is spaced a lateral distance (or a third lateral distance) from the second sidewall 208 to form a second closeout channel 228. As discussed below, the first closeout channel 226 and the second closeout channel 228 are configured to provide a first closeout and a second closeout that run longitudinally on the respective sides of the control surface undergoing fabrication. In addition to the plurality of internal channels 222 and the first closeout channel 226 and the second closeout channel 228, the plurality of blocks 214 is configured to form a hollow trailing edge region 230 that runs laterally between the first sidewall 206 and the second sidewall 208 and longitudinally between a terminal end 232 of each of the plurality of blocks 214 and the trailing edge end 204 of the tool 200. As discussed below, the hollow trailing edge region 230 is configured to provide a solid trailing edge region that runs laterally proximate a trailing edge portion of the control surface undergoing fabrication. In various embodiments, a chamfer 234 may be incorporated into the perimeter regions of one or more of the plurality of blocks 214. The chamfer 234 permits enhanced structural integrity of the control surface in regions where the stingers and the closeouts intersect with the upper and lower surfaces of the control surface.

Figure 2A:
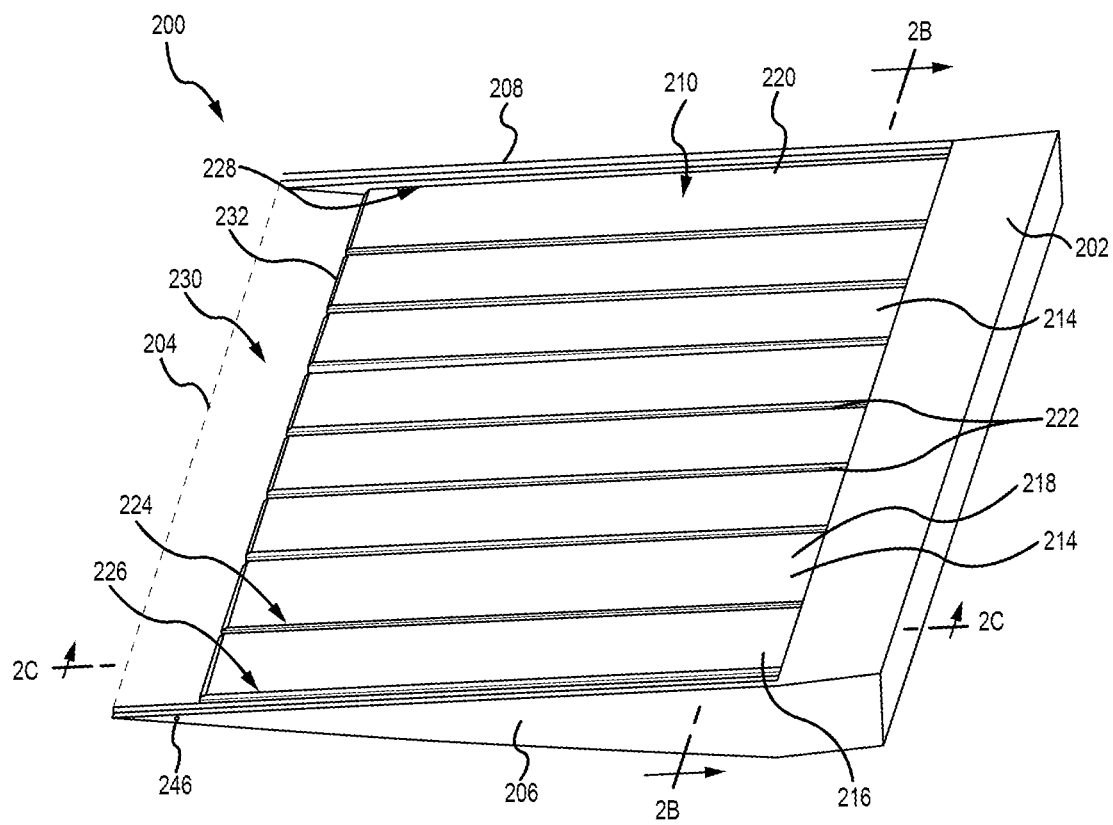
FIGS. 2A, 2B, 2C, 2D and 2E illustrate various aspects of a tool used to fabricate a control surface, in accordance with various embodiments.
Figure 2B:
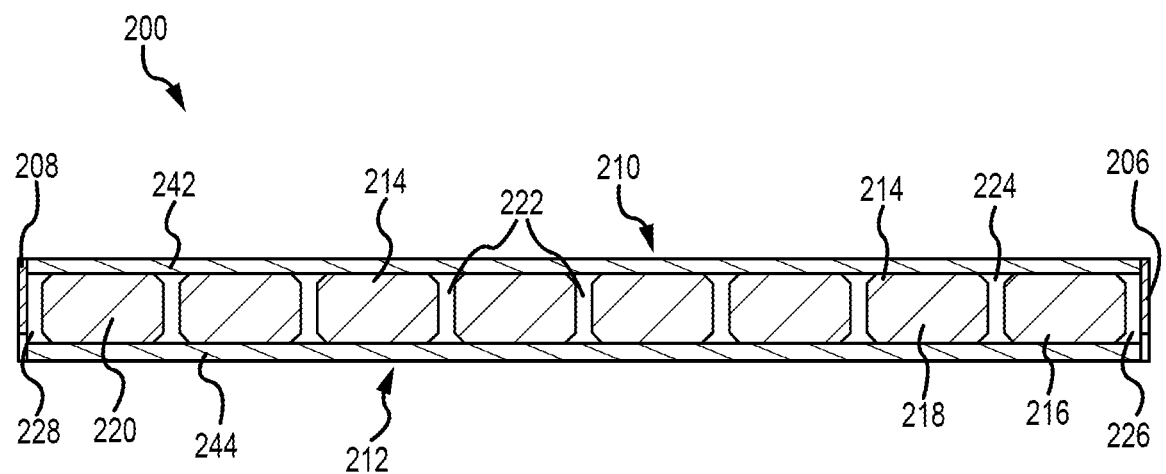
Figure 2C:
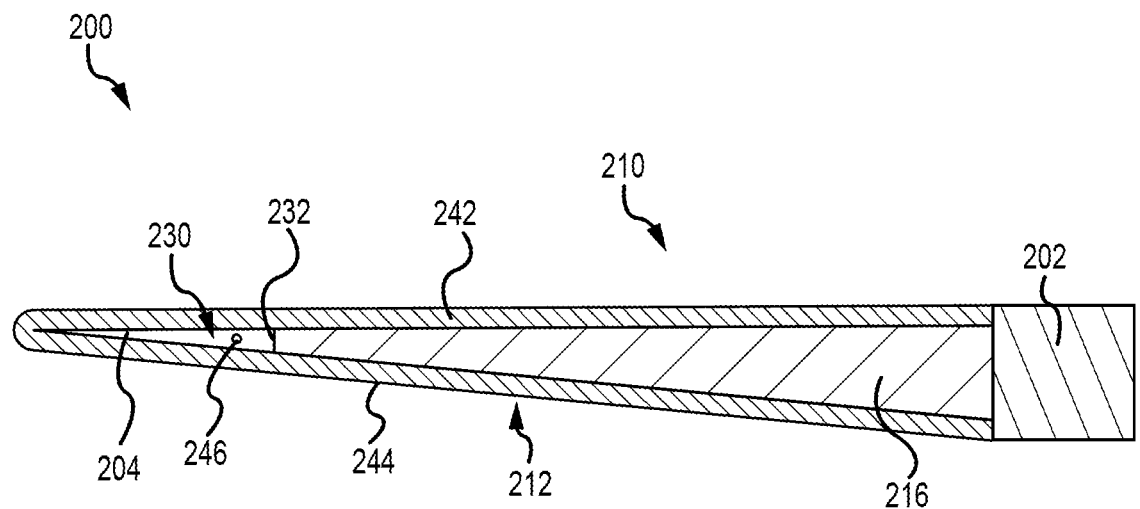
Figure 2D:
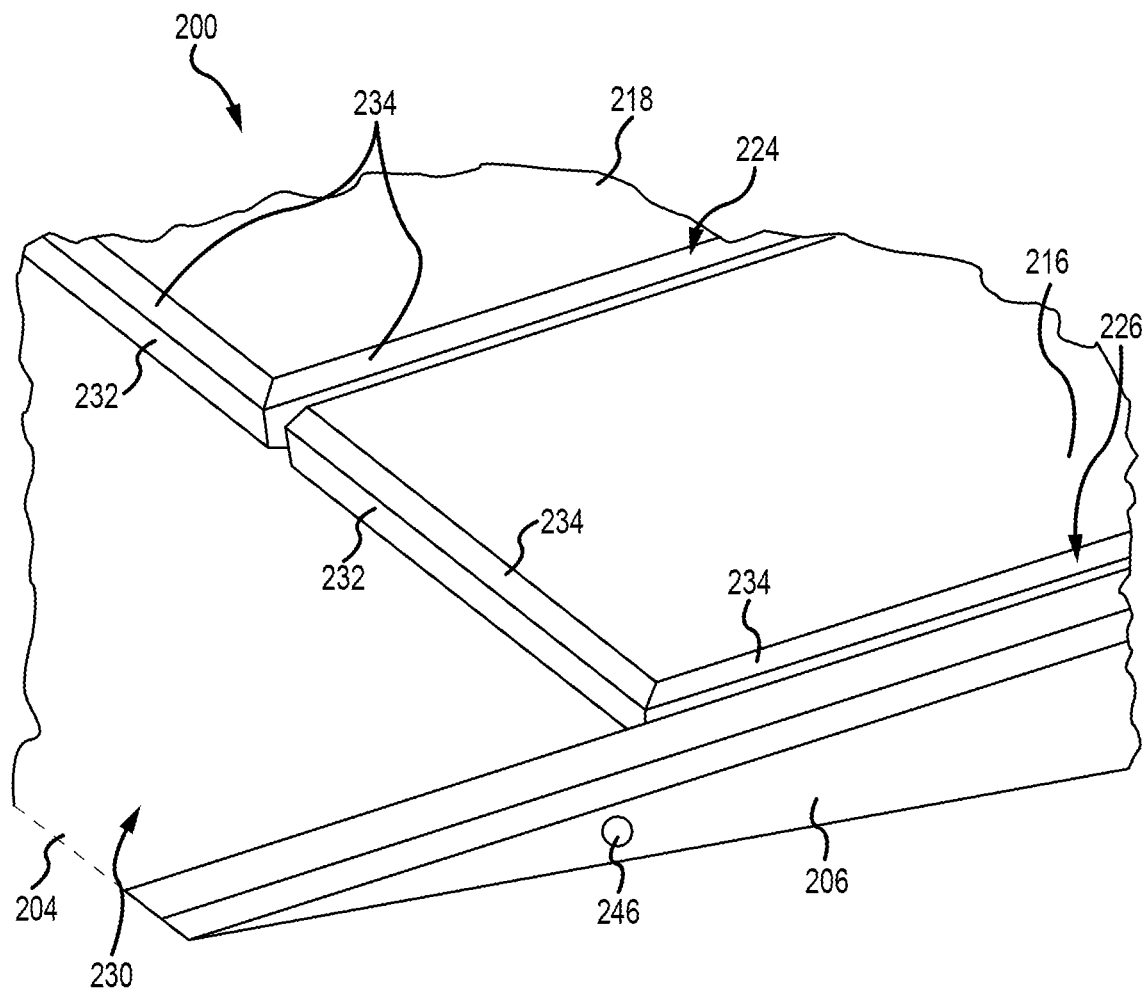
Figure 2E:
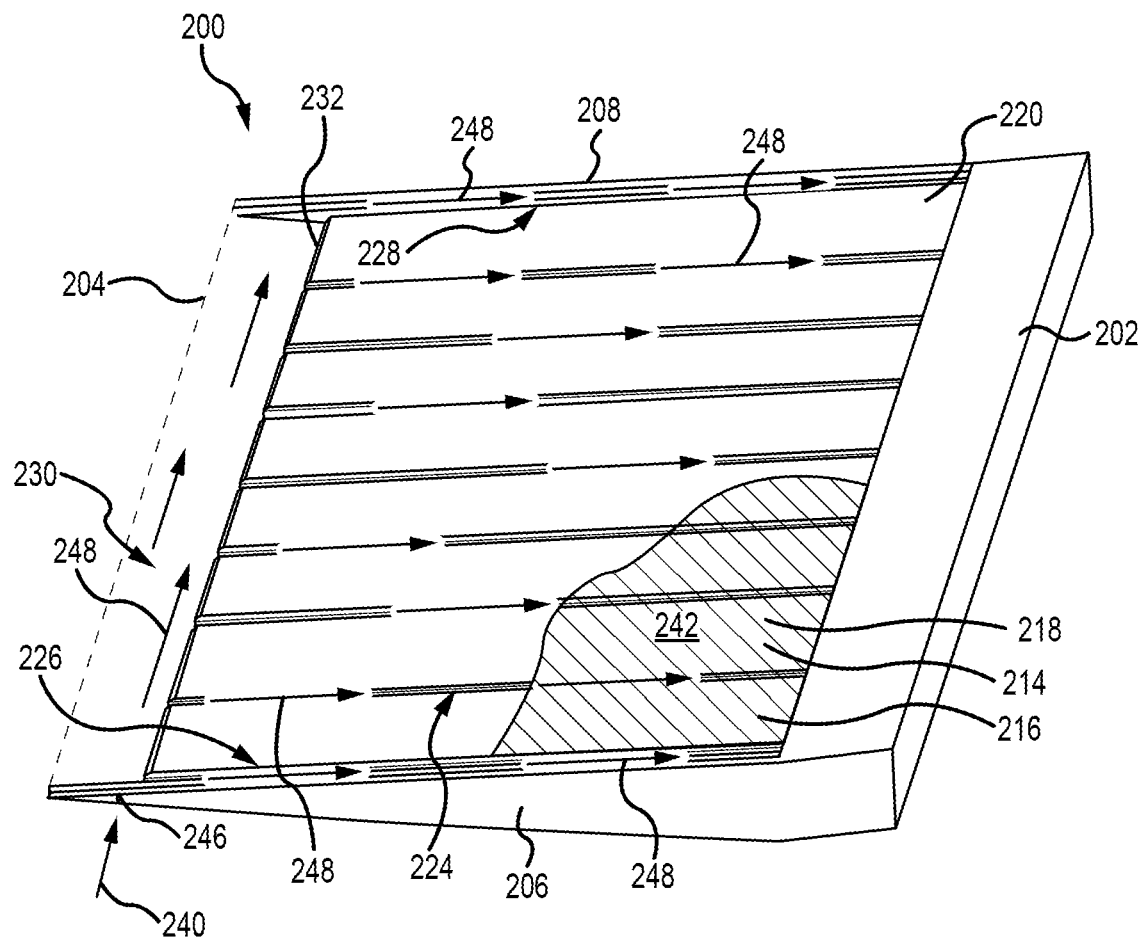

Still referring to FIGS. 2A-2E, and with specific reference to FIG. 2E, the tool 200 is illustrated while being filled with a resin 240 during an overmolding process. Prior to the injection of the resin 240 during the overmolding process, the upper surface 210 and the lower surface 212 of the tool 200 are covered with an upper shell portion 242 and a lower shell portion 244 of a shell or shell-like structure (see also FIGS. 2B and 2C) that function as upper and lower boundaries or covers to form the plurality of internal channels 222, the first closeout channel 226 and the second closeout channel 228, and the hollow trailing edge region 230. As discussed below, the upper shell portion 242 and the lower shell portion 244 are formed by and comprise the upper surface and the lower surface of the control surface undergoing fabrication—e.g., the upper surface 40 and the lower surface of each of the plurality of spoilers 18 described above with reference to FIG. 1B. Still referring to FIG. 2E, once the upper shell portion 242 and the lower shell portion 244 are positioned about the upper surface 210 and the lower surface 212 of the tool 200, the resin 240 may be pumped or injected into the tool 200 via an orifice 246 extending through one of the first sidewall 206 and the second sidewall 208 (or, e.g., through a pair of orifices, one each for both the first sidewall 206 and the second sidewall 208). As the resin 240 enters the tool 200 (as indicated by the arrows 248), the resin 240 fills the hollow trailing edge region 230 and is then forced into each of the plurality of internal channels 222 and into the first closeout channel 226 and the second closeout channel 228 to form, respectively, the solid trailing edge region, the plurality of stringers, and the first closeout and the second closeout, described both above and below.

Figure 3A:
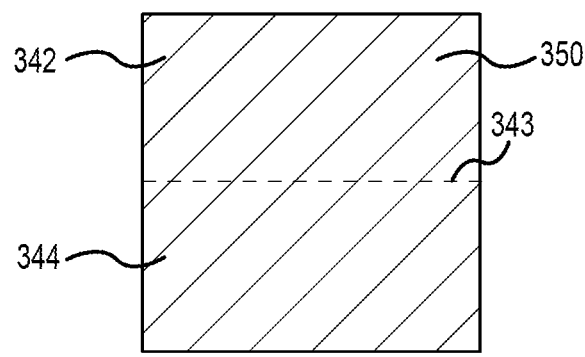
FIGS. 3A, 3B, 3C, 3D, 3E and 3F illustrate various aspects of a method used to fabricate a control surface, in accordance with various embodiments.
Figure 3B:
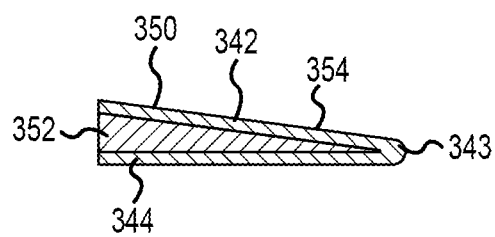
Figure 3C:
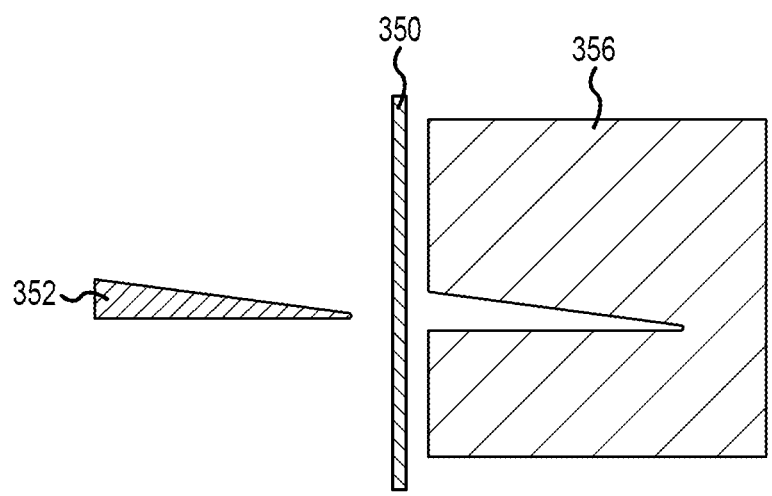

Referring now to FIGS. 3A, 3B, 3C, 3D, 3E and 3F, various aspects of a method used to fabricate a control surface 370 (illustrated in FIG. 3F) are described, in accordance with various embodiments. The method employs a tool 300, similar to the tool 200 described above with reference to FIGS. 2A-2E. In various embodiments, the method commences by thermoforming a blank 350 by either a folding process (see FIG. 3B) or a stamping process (see FIG. 3C), whereby the blank 350 is formed about an inner mold 352 to form a shell 354 having an upper shell portion 342 and a lower shell portion 344, similar to the upper shell portion 242 and the lower shell portion 244 described above with reference to FIGS. 2B, 2C and 2E. As illustrated in FIG. 3B, during a folding process, the blank 350 may be heated and then folded over the inner mold 352 to form the shell 354. As illustrated in FIG. 3C, during a stamping process, the blank 350 may be heated and then stamped into an outer mold 356 via the inner mold 352 being forced into the outer mold 356. Following either process, the shell 354, which comprises a single-piece member having the upper shell portion 342 and the lower shell portion 344 intersecting at a trailing edge surface 343, results (as illustrated in FIG. 3B). An interior surface of the shell 354 has a shape that closely fits an upper surface 310 and a lower surface 312 of the tool 300, which are similar to the upper surface 310 and the lower surface 212 of the tool 200 described above with reference to FIGS. 2A-2E.

Figure 3D:
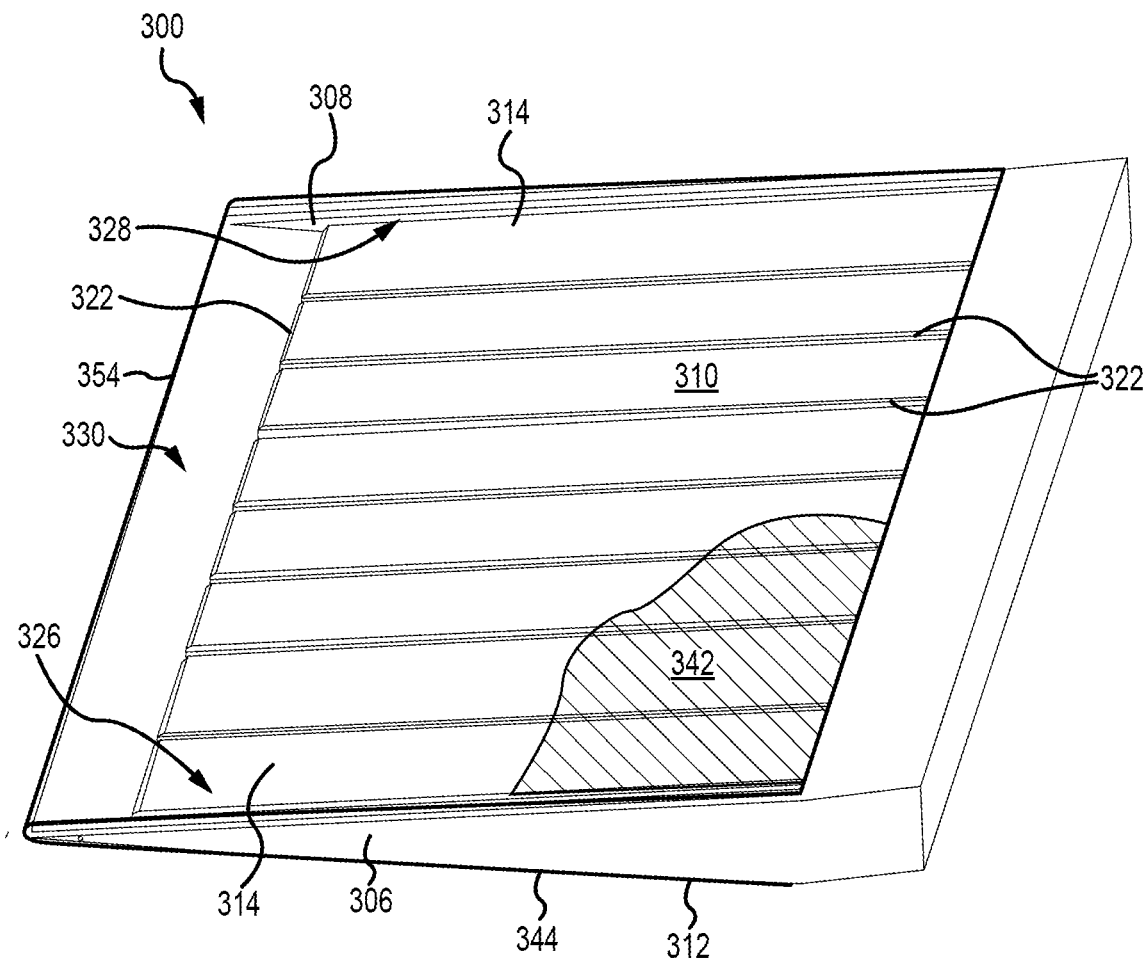
Figure 3E:
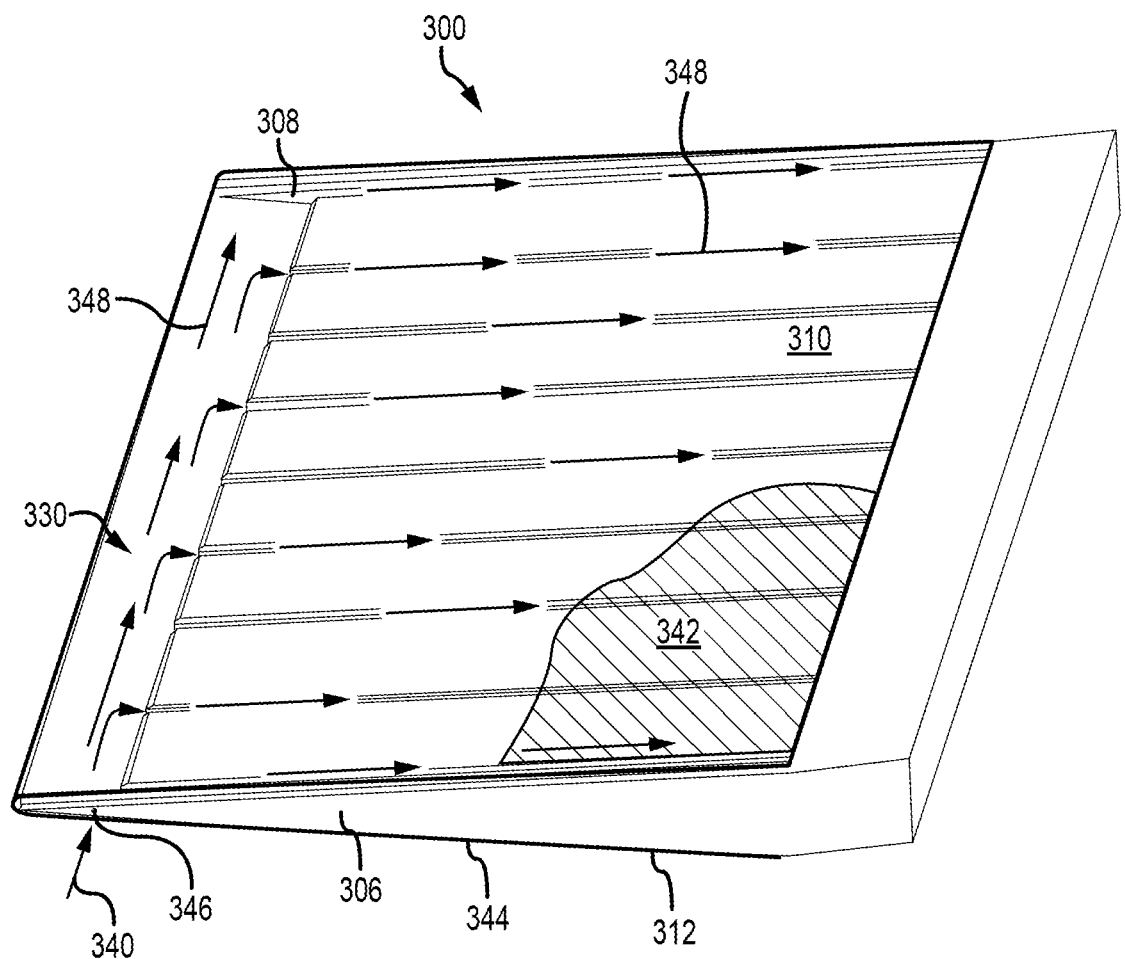
Figure 3F:
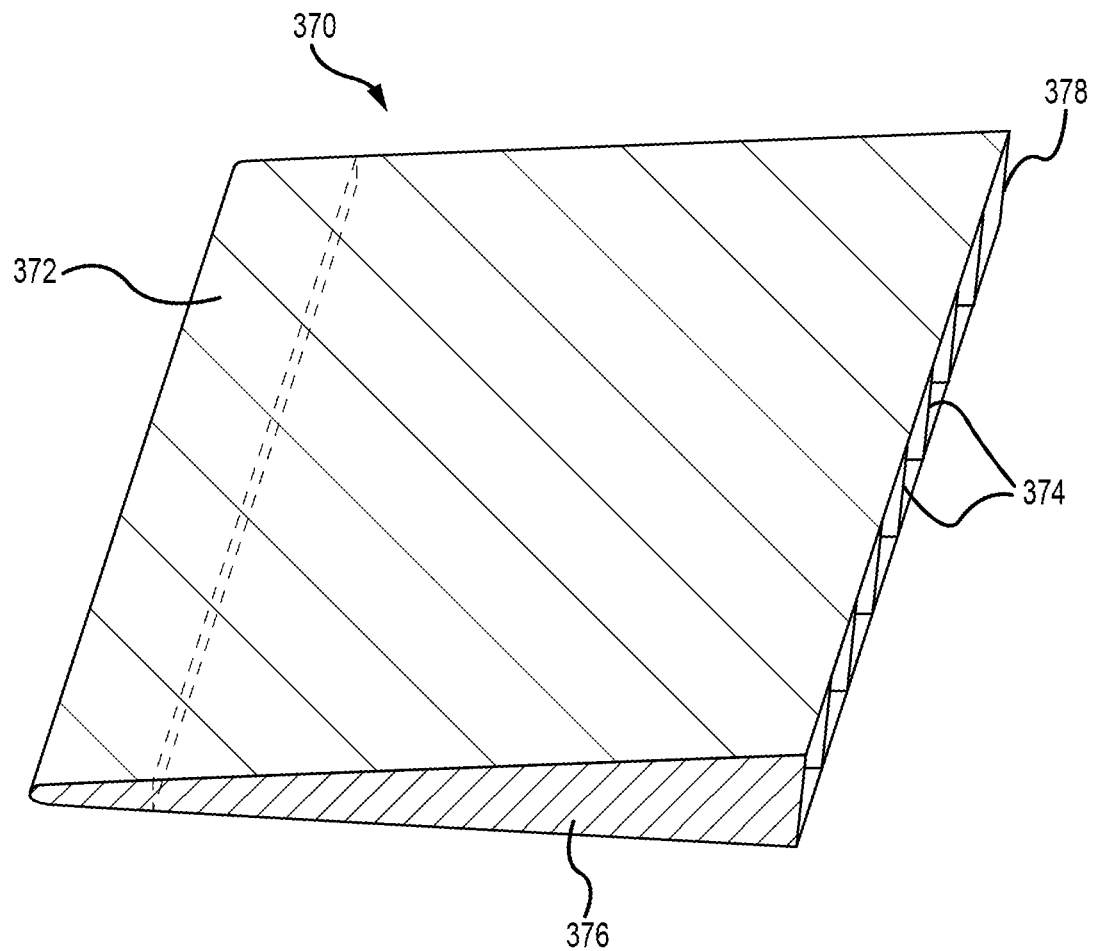

Referring now to FIGS. 3D and 3E, once the shell 354 has been formed, the shell 354 (illustrated with a bold line to define its perimeter) is positioned about the tool 300, such that the upper shell portion 342 of the shell 354 engages the upper surface 310 of the tool 300 and the lower shell portion 344 of the shell 354 engages the lower surface 312 of the tool 300. Once the shell 354 is positioned about the tool 300 as described above, a plurality of internal channels 322, a hollow trailing edge region 330, a plurality of internal channels 322 and a first closeout channel 326 and a second closeout channel 328 are formed, similar to the hollow trailing edge region 230, the plurality of internal channels 222 and the first closeout channel 226 and the second closeout channel 228 described above with reference to FIGS. 2A-2E. In various embodiments, the upper shell portion 342 and the lower shell portion 344 of the shell 354 provide an upper boundary and a lower boundary, respectively, for the hollow trailing edge region 330. Further, in various embodiments, the upper shell portion 342 and the lower shell portion 344 of the shell 354, in conjunction with a terminal end 332 of each one of a plurality of blocks 314 and the trailing edge surface of the shell provide an outer boundary for the hollow trailing edge region 330, with the terminal end 332 of each one of the plurality of blocks providing a forward boundary for the hollow trailing edge region 330.

Once the upper shell portion 342 and the lower shell portion 344 are positioned about the upper surface 310 and the lower surface 312 of the tool 300, a resin 340 may be pumped into the tool 300 via an orifice 346 extending through one of a first sidewall 306 and a second sidewall 308. As the resin 340 enters the tool 300 (as indicated by the arrows 348), the resin 340 fills the hollow trailing edge region 330 and is then forced into each of the plurality of internal channels 322 and into the first closeout channel 326 and the second closeout channel 328. Once the resin 340 has filled the hollow trailing edge region 330 and the various channels just described, the resin is allowed to cool, whereby a bond is created between the upper shell portion 342 and the lower shell portion 344 and the resin 340 filling the hollow trailing edge region 330, the plurality of internal channels 322 and the first closeout channel 326 and the second closeout channel 328. The resulting structure—e.g., the control surface 370—is a single-piece component (or a monolithic control surface or component) that includes a continuous fiber loft (comprising the upper shell portion 342 and the lower shell portion 344), a solid trailing edge region 372, a plurality of stringers 374 (or at least one stringer), and a first closeout 376 and a second closeout 378 (or at least one of the first closeout 376 and the second closeout 378). Once formed, the control surface 370 may undergo further processes to secure attachment structures or the like before installation on an aircraft.

Figure 4:
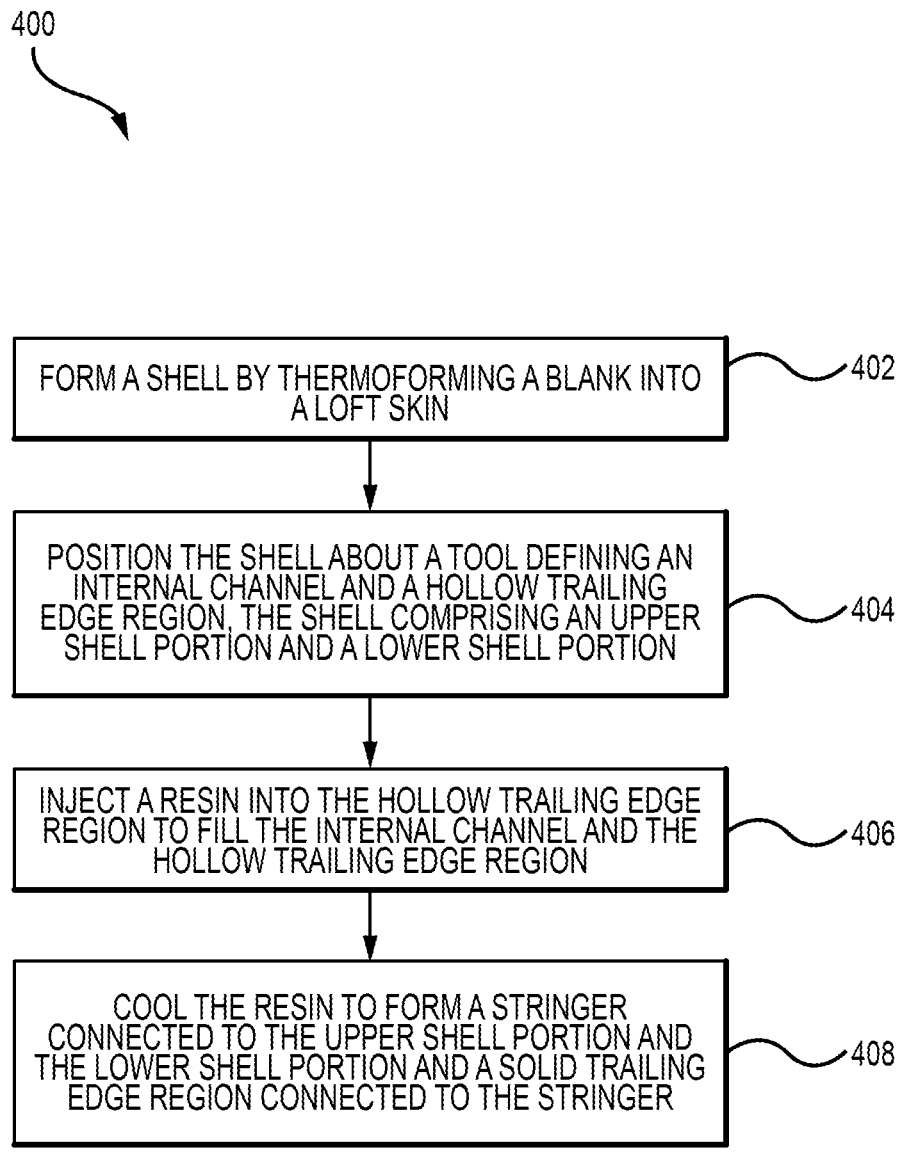
FIG. 4 is a flowchart illustrating a method of fabricating a control surface, in accordance with various embodiments.

Referring now to FIG. 4, a flowchart illustrating various steps of a method 400 for fabricating a control surface is provided, in accordance with various embodiments. A first step 402 includes forming a shell having an upper region and a lower region by thermoforming a blank into a loft skin. A second step 404 includes positioning the shell about a tool defining an internal channel and a hollow trailing edge region, the shell comprising an upper shell portion and a lower shell portion of the control surface. In various embodiments, a third step 406 includes injecting a resin into the hollow trailing edge region to fill the internal channel and the hollow trailing edge region. A fourth step 408 includes cooling the resin to form a stringer connected to the upper shell portion and the lower shell portion and a solid trailing edge region connected to the stringer and to the upper shell portion and the lower shell portion.

In various embodiments, the tool defines at least one of a first closeout channel and a second closeout channel and at least one of the first closeout channel and the second closeout channel are filled with the resin and cooled to form at least one of a first closeout and a second closeout connected to the upper shell portion and the lower shell portion.

In various embodiments, the control surface comprises a monolithic control surface or structure that includes an upper shell portion; a lower shell portion; a stringer connected to the upper shell portion and the lower shell portion; and a solid trailing edge region connected to the upper shell portion, the lower shell portion and the stringer. In various embodiments, the monolithic control surface or structure includes at least one of a first closeout connected to the upper shell portion, the lower shell portion and the solid trailing edge region and a second closeout connected to the upper shell portion, the lower shell portion and the solid trailing edge region. In various embodiments, following construction of the control surface described above, a spar structure may be fabricated using materials similar to those used to fabricate the shell and welded or bolted to the shell to form a control surface ready for mounting to an aircraft.

In various embodiments, the materials used to construct the shell or the shell portions described above may comprise continuous fiber reinforced thermoplastic composite materials, such as, for example, polyaryletherketone (PAEK) combinations that exhibit high-temperature stability and high mechanical strength. Such materials also include polyether ether ketone (PEEK) and polyetherketoneketone (PEKK). The resins described above may comprise, in various embodiments, fiber fills having long, short, or discontinuous fiber reinforced thermoplastic resins, such as, for example, the PAEK, PEEK and PEKK materials referred to above.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by *In Re Nuijten* to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for fabricating a control surface, comprising:
    positioning a shell about a tool defining an internal channel and a hollow trailing edge region, the shell comprising an upper shell portion and a lower shell portion of the control surface, the internal channel runs longitudinally between a leading edge end of the tool and a trailing edge end of the tool, the hollow trailing edge region is disposed at the trailing edge end of the tool and runs laterally between and to a first sidewall of the tool and a second sidewall of the tool, and the internal channel and the hollow trailing edge region are located laterally between the upper shell portion and the lower shell portion;

injecting a resin into the hollow trailing edge region to fill the internal channel and the hollow trailing edge region;

containing the resin laterally between the upper shell portion and the lower shell portion; and cooling the resin to form a stringer connected to the upper shell portion and the lower shell portion and a solid trailing edge region connected to the stringer and to the upper shell portion and the lower shell portion;

wherein:
- the first sidewall is located at a first side of the tool and extends longitudinally between the leading edge end and the trailing edge end;
- the second sidewall is located at a second side of the tool and extends longitudinally between the leading edge end and the trailing edge end;
- the tool includes a first block defining a longitudinal direction running between the leading edge end and the trailing edge end, the first block is spaced laterally from the first sidewall to form a first closeout channel therebetween, the first closeout channel extends longitudinally between and to the leading edge end and the hollow trailing edge region; and
- the tool includes a second block positioned laterally adjacent the first block and spaced a lateral distance from the first block to form the internal channel.

2. The method of claim 1, wherein the tool further defines a second closeout channel.

3. The method of claim 1, wherein the first closeout channel is filled with the resin and cooled to form a first closeout connected to the upper shell portion and the lower shell portion.

4. The method of claim 1, wherein the second sidewall is spaced in the lateral direction from the second block to form a second closeout channel running in the longitudinal direction between the first block and the second sidewall.

5. The method of claim 4, wherein the second closeout channel is filled with the resin and cooled to form a second closeout connected to the upper shell portion and the lower shell portion.

* * * * *